United States Patent [19]

Ho et al.

[11] Patent Number: 5,109,044
[45] Date of Patent: Apr. 28, 1992

[54] IGNITION RESISTANT CARBONATE POLYMER BLEND COMPOSITIONS

[75] Inventors: Thoi H. Ho, Lake Jackson; Samuel A. Ogoe, Missouri City; Todd R. Mayer, Surfside, all of Tex.

[73] Assignee: The Dow Chemical Company, Midland, Mich.

[21] Appl. No.: 426,142

[22] Filed: Oct. 24, 1989

[51] Int. Cl.$^5$ .............................................. C08K 5/521
[52] U.S. Cl. ..................................................... 514/142
[58] Field of Search .......................................... 524/142

[56] References Cited

U.S. PATENT DOCUMENTS

| | | |
|---|---|---|
| 3,852,393 | 12/1974 | Furukawa et al. |
| 4,021,406 | 5/1977 | Touval ................................. 524/142 |
| 4,033,927 | 7/1977 | Borman ................................. 524/131 |
| 4,463,130 | 7/1984 | Serini et al. |
| 4,563,496 | 1/1986 | Lindner et al. |
| 4,692,488 | 9/1987 | Kress et al. |
| 4,710,530 | 12/1987 | Green . |
| 4,710,534 | 12/1987 | Liu ....................................... 525/146 |
| 4,751,260 | 6/1988 | Kress et al. ......................... 524/142 |
| 4,883,835 | 11/1989 | Buysch et al. ....................... 524/142 |

FOREIGN PATENT DOCUMENTS 2089350  6/1982  United Kingdom .

OTHER PUBLICATIONS

Encyclopedia of Polymer Science & Engineering, vol. 7, 166–179 (1987), John Wiley & Sons.
"PB"460 and PB-528 Bromainated Phosphate Ester Flame Retardants (Joseph Green) Paper given at the Fire Retardant Chemicals Assoc. Meeting, Greneliefe, Fla., Mar. 21, 1988.
"Brominated Phosphate Ester Flame Retardants for Engineering Thermoplastics" (Joseph Green) Paper given at Fire Retardant Chem. Assoc. Mtg., San Antonio, Tex., Mar. 12, 1989.

Primary Examiner—Veronica P. Hoke

[57] ABSTRACT

Ignition resistant halo aromatic containing polymer compositions are disclosed which are mixtures of a blend of styrene-butadiene-acrylonitrile copolymers and carbonate polymers, 0.001 to 20% by weight of a high elastic memory polytetrafluoroethylene having a heat shrinkage equal to or greater than 15%, and 0.1 to 30% by weight of a halogenated aryl phosphate having at least one bromoaryl group.

21 Claims, No Drawings

IGNITION RESISTANT CARBONATE POLYMER BLEND COMPOSITIONS

BACKGROUND OF THE INVENTION

This invention relates to ignition resistant thermoplastic compositions made with blends of styrene-butadiene-acrylonitrile copolymers (ABS copolymers) and carbonate polymers containing polytetrafluoroethylene and brominated organo phosphorous compounds which act to reduce the susceptibility of such compositions to ignition and/or burning or at least to minimize the dripping of molten polymer when exposed to fire conditions.

Thermoplastic polymers have found extensive commercial application because of their excellent physical properties. These thermoplastic polymers are suitable for the manufacture of molded parts wherein impact strength, rigidity, toughness, heat resistance, and excellent electrical properties are required. However, these polymers exhibit a brief but definite burning time when contacted with an open flame.

U.S. Pat. No. 3,852,393 discloses a flame retardant blend of polycarbonates with ABS resins and a halogenated hydrocarbon flame retardant.

U.S. Pat. No. 4,463,130 discloses a flame retardant blend of polycarbonates with a halogenated flame retardant, polystyrene, polytetrafluoroethylene resins, and a polyphosphate.

U.S. Pat. No. 4,563,496 discloses the use of a combination of halogenated compounds and metal oxides to improve the ignition resistance of blend of polycarbonate and acrylonitrile-butadiene-styrene copolymer (ABS). However, the metal oxides result in the thermal instability of the polycarbonates.

U.S. Pat. No. 4,692,488 discloses a blend of a polycarbonate, a copolymer of styrene and acrylonitrile, triphenylphosphate, and tetrafluoropolyethylene.

The article by Joseph Green "PB-460 and PB-528 Brominated Phosphate Ester Flame Retardants" (Fire Retardant Chemicals Association Meeting, Grenelefe, Florida, March 21, 1988) discloses that PB-460 and PB-a 528 are brominated aromatic phosphate esters with 60-70 bromine and 3-4% phosphorus.

The article by Joseph Green "Brominated Phosphate Ester Flame Retardants for Engineering Thermoplastics" (Fire Retardant Chemicals Association Meeting, San Antonio, Texas, March 12, 1989) discloses that PB-460 is a brominated aromatic phosphate ester with 60% bromine and 4% phosphorus and that when blended with Teflon 6C, polycarbonate resin and ABS resin, the blend has a V-0 UL-94 rating.

SUMMARY OF THE INVENTION

The present invention is an ignition resistant thermoplastic composition consisting essentially of A) a blend of styrene-butadiene-acrylonitrile copolymers and carbonate polymers, B) 0.001 to 20% by weight and preferably 0.1 to 4.0% by weight of a high elastic memory polytetrafluoroethylene having a heat shrinkage equal to or greater than 15%, and C) 1.0 to 30% by weight and preferably 2.0 to 20% by weight a halogenated aryl phosphate having the formula

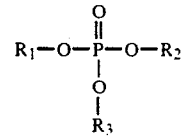

wherein $R_1$, $R_2$ and $R_3$ are alkyl groups of 1-8 carbons, alkaryl groups of 7-20 carbons, or bromoaryl groups having 1-5 bromine radicals and 6-20 carbons with the proviso that the phosphorus compound has at least one bromoaryl group.

The useful blends of ABS and carbonate polymers have about 5.0 to about 95% by weight styrene-butadiene-acrylonitrile copolymers and about 95 to about 5.0% by weight carbonate polymers and preferably a blend of about 20 to about 80% by weight styrene-butadiene-acrylonitrile copolymers and about 80 to about by weight carbonate polymers The fire retardant polymer compositions of the present invention are suitably employed in most applications in which opaque modified polycarbonates have been previously utilized. Applications of particular interest for the utilization of the polymer compositions of this invention are pigmented and/or colored polymers useful as: automobile parts, e.g., air filters, fan housings, exterior components, housings for electrical motors, appliances, business and office equipment, photographic equipment, and aircraft applications.

DETAILED DESCRIPTION OF THE INVENTION

The carbonate polymers employed in the present invention are advantageously aromatic carbonate polymers such as the trityl diol carbonates described in U.S. Pat. Nos. 3,036,036; 3,036,037; 3,036,038 and 3,036,039; polycarbonates of bis(4-hydroxy-phenyl)-alkylidenes (often called bisphenol-A type diols), including their aromatically and aliphatically substituted derivatives such as disclosed in U.S. Pat. Nos. 2,999,835; 3,038,365, 3,334,154, and 4,299,928; and carbonate polymers derived from other aromatic diols such as described in U.S. Pat. No. 3,169,121.

It is understood, of course, that the carbonate polymer may be derived from (1) two or more different dihydric phenols or (2) one or more dihydric phenols and one or more hydroxy- or acid-terminated reactants such as dicarboxylic acids, or alkylene glycols in the event a carbonate copolymer or interpolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121; 4,287,787; 4,156,069; 4,260,731 and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known; for example, several suitable methods are disclosed in the aforementioned patents which are hereby incorporated by reference in their entirety.

Suitable polytetrafluoroethylene polymers for use in this invention are those adapted to form a fibril structure to stabilize the polymer under molten conditions. Such polymers are generally disclosed by U.S. Pat. Nos.

3,005,795, 3,671,487 and 4,463,130. The teachings of these patents are incorporated herein by reference.

In addition, the polytetrafluoroethylene (PTFE) polymers must have a high elastic memory and/or have a heat shrinkage equal to or greater than 15% when tested under the following conditions.

Polycarbonate resin blended with 0.5% by weight of PTFE was injection molded with a 75 ton Newbury molding machine into bars having the dimensions of 5"×½"×1/16". The molding conditions are:
Barrel Temperature: 250° C.
Mold Temperature: 180° C.
Screw Speed: 150 rpm
Pressure: 1000 psi The molded bars were then heated at 160° C. for one hour and the shrinkage was measured and compared to the length of the sample before and after heating.

The results of several tests are shown in Table 1.

TABLE 1

| Run | PTFE* | % Shrinkage | UL-94 at 1/16" |
|---|---|---|---|
| 1 | 8 | 1 | Fail |
| 2 | DXL-6000 | 1 | Fail |
| 3 | 6C | 25 | V-0 |
| 4 | 60 | 25 | V-0 |
| 7 | 64 | 15 | V-0 |
| 8 | 6CN | 24 | V-0 |
| 9 | 65 | 22 | V-0 |
| 10 | 67 | 22 | V-0 |

*Various grades of Teflon ™ from DuPont

Table 1 shows that only high elastic memory PTFE is effective as an ignition resistant (IR) additive. The high elastic memory PTFE helps the polycarbonate sample contract upon exposure to a flame source and thus imparts ignition resistance to the polycarbonate. The relationship between the percent shrinkage and the UL-94 test is also shown in Table 1. The PTFE that gives a polycarbonate shrinkage greater than 15% is effective as an IR additive. Some examples of PTFE that have high elastic memory such as Teflon TM 6C, 60, 64, CN, 65, and 67 are shown in Table 1. The PTFE that have a low percent of shrinkage such as Teflon TM DXL-6000 and Teflon TM did not impart ignition resistance to the polycarbonate.

Suitable fluorine containing polymers are those adapted to form a fibril structure to stabilize the polymer under molten conditions. Such polymers are known to include polytetrafluoroethylene, as disclosed by U.S. Pat. Nos. 3,005,795, 3,671,487 and 4,463,130. The teachings of these patents are incorporated herein by reference.

The rubber modified vinylaromatic(meth)acrylonitrile copolymers suitably employed according to the present invention preferably include butadiene rubber modified copolymers of vinyl aromatic monomers, especially styrene and acrylonitrile optionally further containing maleic anhydride, alkyl methacrylate, N-substituted maleimide or other polymerizable comonomers. Such copolymers are herein collectively referred to as ABS resins. Preferred ABS resins are those prepared by the solution or bulk polymerization of styrene and acrylonitrile comonomers in the presence of dissolved polybutadiene rubber. Alternatively such ABS resins may be prepared by mixing together previously prepared matrices comprising the vinyl monomer, (meth)acrylonitrile, optional comonomer(s) and rubbery graft copolymers such as styrene/acrylonitrile grafted-polybutadiene or styrene/butadiene copolymer rubber lattices. In addition to polybutadiene or styrene/butadiene copolymers other suitable rubbers include the well known copolymers of ethylene and propylene optionally containing copolymerizable conjugated dienes (known as EPDM rubbers), polyacrylates such as polybutylacrylate and mixtures of the foregoing rubbers. Preferred weight ratios in the ABS copolymer are 2-40% by weight of acrylonitrile, 2-35% of butadiene, and 30-80% of styrene or a substituted styrene.

The amount of rubber modified vinylaromatic(meth)acrylonitrile copolymer incorporated into the blend of the present invention may range from about 5 percent to about 95 percent by weight and preferably from about 7 percent to about 50 percent by weight based on total composition weight.

The ABS copolymers can be prepared by free radical polymerization, in particular by emulsion, suspension, solution or bulk polymerization. Useful methods for preparing these copolymers may be found in U.S. Pat. Nos. 2,505,349; 2,550,139; 2,698,313; 2,713,566; 2,820,773; and 2,908,661. These patents are incorporated by reference herein.

The phosphorus compounds which are suitable according to the invention have the formula given below.

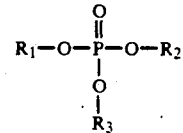

wherein $R_1$, $R_2$ and $R_3$ are alkyl groups of 1-8 carbons, alkaryl groups of 7-20 carbons, or bromoaryl groups having 1-5 bromine radicals and 6-20 carbons with the proviso that there is always present in the phosphorus compound at least one bromoaryl group.

Exemplary phosphorous compounds which are suitable according to the invention are tris (2,4)-dibromophenyl) phosphate, tris (4-bromophenyl) phosphate, dicresyl 4-bromophenyl phosphate, 2,4-dibromophenyl 2-ethylcresyl phosphate, 2,4-dibromophenyl methyl phosphate and diethyl 4-bromophenyl phosphate. The preparation and use of these brominated phosphorous compounds is well known from U.S. Pat. Nos. 3,557,053; 4,033,927 and 4,710,530 which are incorporated herein by reference.

The useful amounts of halogenated aryl phosphates range from 1.0 to 30 percent by weight. The preferred range of phosphates is from 3.0 to 20 percent by weight.

The carbonate polymer compositions of the present invention are suitably prepared by combining the ingredients in effective amounts using any of a variety of blending procedures conventionally employed for polymer blends. For example, dry pellets of the carbonate polymer, and the other additives can be dry blended and the resulting dry blend extruded into the desired shape.

The amount of the fibril forming polytetrafluoroethylene is in the range from about 0.001 to about 20 percent and preferably in the range from about 0.1 to about 5.0 percent by weight based on total composition weight.

In addition, other additives can be included in the modified carbonate polymer composition of the present invention such as fillers (i.e., glass fibers), pigments, dyes, antioxidants, heat stabilizers, ultraviolet light absorbers, mold release agents, impact modifiers and other additives commonly employed in carbonate polymer compositions.

The following example and controls are given to further illustrate the invention and should not be construed as limiting its scope. In the following runs, all parts and percentages are by weight unless otherwise indicated.

EXAMPLE 1

An ignition resistant polycarbonate/acrylonitrile-butadiene-styrene (PC-ABS) blend was prepared by adding 0.7 weight % Teflon 6C, 10 weight % tris-2,4-dibromophenyl) phosphate (TDBP) to 55.4 weight of a heat stabilized polycarbonate having melt flow rate of 10 g/minute, 4.0 weight % of a methylmethacrylate-styrene-butadiene core/shell graft copolymer from Rohm and Haas (Paraloid 3607) and 29.9 weight % of ABS (ABS 213 from the Dow Chemical Company). The weighed sample was dry blended on a Lightning blender for one minute with constant agitation. The resultant blended material was starve fed to a 30 mm twin screw extruder at 230° C barrel temperature. The extruded pellets were dried in an oven at 100° C for 3 hours and molded into bars for flammability measurements.

CONTROL 1

The procedure for the Example was repeated using no additives.

CONTROL 2

The procedure for the Example was repeated without using tris-2,4-dibromophenyl) phosphate (TDBP).

CONTROL 3

The procedure for the Example was repeated using no Teflon 6C.

CONTROL 4

The procedure for the Example was repeated using triphenylphosphate (TPP) instead of tris-2,4dibromophenyl) phosphate (TDBP).

TABLE II

| Run* | PC wt % | ABS wt % | Teflon 6C wt % | TDBP wt % | TPP wt % | UL-94 VO rating at 1/16" |
|---|---|---|---|---|---|---|
| Control 1 | 62.4 | 33.6 | 0 | 0 | 0 | fail |
| Control 2 | 62.0 | 33.3 | 0.7 | 0 | 0 | fail |
| Control 3 | 55.9 | 30.1 | 0 | 10.0 | 0 | fail |
| Control 4 | 55.4 | 29.9 | 0.7 | 0 | 10.0 | fail |
| Example 1 | 55.4 | 29.9 | 0.7 | 10.0 | 0 | V-0 |

* = with 4.0% MBS

The results in Table II show that the ignition resistant composition of the Example is very effective due to the synergistic effect of Teflon and tris(2,4-dibromophenyl) phosphate (TDBP) and TDBP is more effective than triphenylphosphate (compare Control 4 and the Example).

What is claimed is:

1. An ignition resistant aromatic thermoplastic composition consisting essentially of
A) a blend of styrene-butadiene-acrylonitrile copolymers and carbonate polymers,
B) 0.001 to 20% by weight of a high elastic memory polytetrafluoroethylene having a heat shrinkage equal to or greater than 15%, and
C) 1.0 to 30% by weight of a halogenated aryl phosphate having the formula

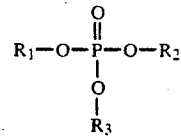

wherein $R_1$, $R_2$ and $R_3$ are alkyl groups of 1-8 carbons, alkaryl groups of 7-20 carbons, or bromoaryl groups having 1-5 bromine radicals and 6-20 carbons with the proviso that the phosphorus compound has at least one bromoaryl group.

2. The composition as set forth in claim 1 wherein said blend comprises about 5.0 to about by weight styrene-butadiene-acrylonitrile copolymers and about 95 to about 5% by weight carbonate polymers.

3. The composition as set forth in claim 1 wherein the styrene-butadiene-acrylonitrile copolymer contains 2-40% by weight of acrylonitrile, 2-35% of butadiene, and 30-80% of styrene or a substituted 4. The composition as set forth in claim 1 wherein the carbonate polymer is a bis phenol A polycarbonate.

5. The composition as set forth in claim 1 wherein the halogenated aryl phosphate is a member of the group consisting of tris (2,4)-dibromophenyl) phosphate, tris (4-bromophenyl) phosphate, dicresyl 4-bromophenyl phosphate, 2,4-dibromophenyl 2-ethylcresyl phosphate, 2,4-dibromophenyl methyl phosphate and diethyl 4-bromophenyl phosphate.

6. The composition as set forth in claim 1 wherein the halogenated aryl phosphate is tris (2,4-dibromophenyl) phosphate.

7. An ignition resistant aromatic thermoplastic composition consisting essentially of
A) a blend of about 20 to about 80% by weight styrene-butadiene-acrylonitrile copolymers and about 80 to about 20% by weight carbonate polymers,
B) 0.1 to 4.0% by weight of a high elastic memory polytetrafluoroethylene having a heat shrinkage equal to or greater than 15%, and
C) 2.0 to 20% by weight of a halogenated aryl phosphate having the formula

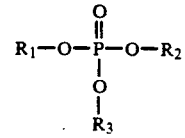

wherein $R_1$, $R_2$ and $R_3$ are alkyl groups of 1-8 carbons, alkaryl groups of 7-20 carbons, or bromoaryl groups having 1-5 bromine radicals and 6-20 carbons with the proviso that there is always present in the phosphorus compound at least one bromoaryl group.

8. The composition as set forth in claim 7 wherein the styrene-butadiene-acrylonitrile copolymer contains 2-40% by weight of acrylonitrile, 2-35% of butadiene, and 30-80% of styrene or a substituted 9. The composition as set forth in claim 7 wherein the carbonate polymer is a bis phenol A polycarbonate.

10. The composition as set forth in claim 7 wherein the halogenated aryl phosphate is a member of the group consisting of tris (2,4)-dibromophenyl) phosphate, tris (4-bromophenyl) phosphate, dicresyl 4-bromophenyl phosphate, 2,4-dibromophenyl 2-ethylcresyl phosphate, 2,4-dibromophenyl methyl phosphate and diethyl 4-bromophenyl phosphate.

11. The composition as set forth in claim 7 wherein the halogenated aryl phosphate is tris (2,4-dibromophenyl) phosphate.

12. An ignition resistant aromatic thermoplastic composition consisting essentially of
   A) a blend of styrene-butadiene-acrylonitrile copolymers and carbonate polymers,
   B) 0.1 to 4.0% by weight of a high elastic memory polytetrafluoroethylene having a heat shrinkage equal to or greater than 15%, and
   C) 2.0 to 20% by weight of a halogenated aryl phosphate having the formula

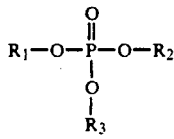

wherein $R_1$, $R_2$ and $R_3$ are alkyl groups of 1–8 carbons, alkaryl groups of 7–20 carbons, or bromoaryl groups having 1–5 bromine radicals and 6–20 carbons with the proviso that there is always present in the phosphorus compound at least one bromoaryl group.

13. The composition as set forth in claim 12 wherein the styrene-butadiene-acrylonitrile copolymer contains 2–40% by weight of acrylonitrile, 2–35% of butadiene, and 30–80% of styrene or a substituted 14. The composition as set forth in claim 12 wherein the carbonate polymer is a bis phenol A polycarbonate.

15. The composition as set forth in claim 12 wherein the halogenated aryl phosphate is a member of the group consisting of tris (2,4)-dibromophenyl) phosphate, tris (4-bromophenyl) phosphate, dicresyl 4-bromophenyl phosphate, 2,4-dibromophenyl 2-ethylcresyl phosphate, 2,4-dibromophenyl methyl phosphate and diethyl 4-bromophenyl phosphate.

16. The composition as set forth in claim 12 wherein the halogenated aryl phosphate is tris (2,4-dibromophenyl) phosphate.

17. An ignition resistant aromatic thermoplastic composition consisting essentially of
   A) a blend of 5.0 to 95.0% by weight styrene-butadiene-acrylonitrile copolymers and 5.0 to 95.0% by weight carbonate polymers,
   B) 0.1 to 4.0% by weight of a high elastic memory polytetrafluoroethylene having a heat shrinkage equal to or greater than 15%, and
   C) 2.0 to 20% by weight of a halogenated aryl phosphate having the formula

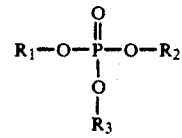

wherein $R_1$, $R_2$ and $R_3$ are alkyl groups of 1–8 carbons, alkaryl groups of 7–20 carbons, or bromoaryl groups having 1–5 bromine radicals and 6–20 carbons with the proviso that there is always present in the phosphorus compound at least one bromoaryl group.

18. The composition as set forth in claim 17 wherein the styrene-butadiene-acrylonitrile copolymer contains 2–40% by weight of acrylonitrile, 2–35% of butadiene, and 30–80% of styrene or a substituted 19. The composition as set forth in claim 17 wherein the carbonate polymer is a bis phenol A polycarbonate.

20. The composition as set forth in claim 17 wherein the group consisting of tris (2,4)-dibromophenyl) phosphate, tris (4-bromophenyl) phosphate, dicresyl 4-bromophenyl phosphate, 2,4-dibromophenyl 2-ethylcresyl phosphate, 2,4-dibromophenyl methyl phosphate and diethyl 4-bromophenyl phosphate.

21. The composition as set forth in claim 17 wherein the halogenated aryl phosphate is tris (2,4-dibromophenyl) phosphate.

* * * * *

UNITED STATES PATENT AND TRADEMARK OFFICE
CERTIFICATE OF CORRECTION

PATENT NO. : 5,109,044

DATED : April 28, 1992

INVENTOR(S) : Thoi H. Ho, et al

It is certified that error appears in the above-identified patent and that said Letters Patent is hereby corrected as shown below:

Col. 6 line 20, following "to about" insert --95%--.
     line 26, following "substituted" insert --styrene.--
     line 66, following "substituted" insert --styrene.--

Col. 7 line 38, following "substituted" insert --styrene.--

Col. 8 line 33, following "substituted" insert --styrene.--
     line 36, following "wherein" insert --the halogenated aryl phosphate is a member of--.

Signed and Sealed this

Tenth Day of August, 1993

Attest:

MICHAEL K. KIRK

Attesting Officer     Acting Commissioner of Patents and Trademarks